United States Patent [19]
Ambros et al.

[11] Patent Number: 6,030,552
[45] Date of Patent: Feb. 29, 2000

[54] PASTE HAVING PREDETERMINED ELECTRICAL CONDUCTIVITY, AND RESISTIVE FILM MADE FROM THE PASTE

[75] Inventors: Peter Ambros, Hohenroth; Hugo Johannes, Brendlorenzen; Franz Kissner, Hohenroth, all of Germany

[73] Assignee: Preh-Werke GmbH & Co. KG, Bad Neustadt/Saale, Germany

[21] Appl. No.: 09/057,595

[22] Filed: Apr. 9, 1998

[30] Foreign Application Priority Data

Apr. 9, 1997 [DE] Germany ............. 197 14 561

[51] Int. Cl.$^7$ ............. H01B 1/04
[52] U.S. Cl. ............. 252/502; 423/460; 501/95.2; 501/99; 252/510
[58] Field of Search ............. 252/511, 512, 252/518, 503, 504, 510, 502; 524/495, 496; 423/460; 501/95.2, 99

[56] References Cited

U.S. PATENT DOCUMENTS

| | | | |
|---|---|---|---|
| 4,541,985 | 9/1985 | Devillard et al. | 419/10 |
| 5,219,494 | 6/1993 | Ambros et al. | 252/511 |
| 5,796,574 | 8/1998 | Saito et al. | 361/502 |

FOREIGN PATENT DOCUMENTS

| | | |
|---|---|---|
| 30 02 112 A1 | 7/1981 | Germany . |
| 0 399 295 A2 | 11/1990 | Germany . |
| 27 18 308 A1 | 1/1997 | Germany . |

OTHER PUBLICATIONS

Shigeru, Patent Abstracts of Japan, 03164416, Jul. 16, 1991.
Kazumi, Patent Abstracts of Japan, 03038004, Feb. 19, 1991.
Lersmacher et al., Chemie–Ing. –Techn., 42, 1970, pp. 659–669.
Vom Duroplast zum Keramischen Hochleistungswerkstoff, Rainer Duebgen, *Plastverarbeiter*, vol. 41, No. 6, pp. 16–21, 1990.
Patent Abstracts of Japan C–875, 1991, JP 3–164416 A.
Patent Abstracts of Japan C, 1994, JP 06340407 A.

*Primary Examiner*—Yogendra Gupta
*Assistant Examiner*—Derrick G. Hamlin
*Attorney, Agent, or Firm*—Griffin, Butler, Whisenhunt and Szipl, LLP

[57] ABSTRACT

The invention relates to a method for producing powdery, vitreous carbon, and a paste made therefrom for producing resistive films having predetermined electrical conductivity. In production methods known in the art, pyrolysis of acrylamides is performed in mixture with water-soluble salts and, following pyrolysis, the powdered portion of the vitreous carbon is recovered by dissolving the salt component in water. The vitreous carbon is then dried, and the powder obtained in this manner is pulverized once again, as needed. A disadvantage of this method is that it is very time-consuming. In the solution now recommended, a preferably aromatic polymer is cured into a resin that is cross-linked in three dimensions, and in this state is ground to a powder prior to pyrolysis. Pyrolysis of the resulting powder is performed in a nitrogen atmosphere, so that powdered, vitreous carbons having different resistivities are obtained by using different final pyrolysis temperatures in each pyrolysis process. The vitreous carbon having a specific electrical resistivity obtained through pyrolysis is then dispersed into a binding agent and is ground in a mill together with the binding agent to a grain size of <10 $\mu$m. Then the viscosity of the paste with the vitreous carbon obtained in this manner for producing a resistive film is established by addition of a quantity of solvent for thinning. It is then possible to produce various resistive films from the paste produced in this manner, with a set but constant packing density of the vitreous carbon, having maximum mechanical and electrical stability that is very sturdy and abrasion-resistant in comparison to the surrounding area.

7 Claims, No Drawings

PASTE HAVING PREDETERMINED ELECTRICAL CONDUCTIVITY, AND RESISTIVE FILM MADE FROM THE PASTE

BACKGROUND OF THE INVENTION

This invention relates to a resistive film made from a paste comprising a powdery, vitreous carbon as an electrically conductive component in admixture with an electrically non-conductive component. This invention also relates to a method for producing a vitreous carbon in powder form by pyrolyzing a resin in inert atmosphere.

Vitreous carbon has a Mohs' hardness of 6. Therefore, reducing it to a powder entails significant effort.

Production of powdery, vitreous carbon is disclosed in German patent document DE 27 18 308 A1, in which acrylamides mixed with water-soluble salts are pyrolyzed, and a vitreous carbon component is recovered following pyrolysis by dissolving a salt component in water. The vitreous carbon is then dried, and a powder produced in this manner is further pulverized as needed. The method is very time-consuming.

Use of an precursor polymer having a three-dimensional, cross-linked structure for producing a vitreous carbon is disclosed in *Plastverarbeiter*, vol. 41, no. 6, pages 16–21 (1990). After shaping via casting or molding, the polymer is cured and additionally machined down. No mention is made of possible pulverization of the vitreous carbon.

German patent document DE 30 02 112 A1 discloses a paste for producing polymer-film integrated circuits having predetermined electrical conductivity. A predetermined electrical resistivity of the polymer-film integrated circuits to be produced is achieved by mixing electrically conductive and electrically non-conductive film components. A desired resistivity value is thus produced by adding the electrically non-conductive component.

It is generally known that the electrical conductivity of a paste, or of a film made of a paste, formed as a mixture of an electrically conductive component and an electrically non-conductive component, is largely determined by the specific electrical conductivity and the concentration, i.e. a packing density, of the conductive component in the film system. Electrical resistivity in the film increases nearly exponentially when the conductive component reaches a critical minimum concentration in the film. When the electrically conductive component is increased, electrical resistivity stabilizes once an optimal concentration is achieved. When a specific resistivity value is established through proportional increases in the electrically non-conductive component, electrical and mechanical stability may diminish as a result, owing to lack of homogeneity of the film.

When this paste is used for a resistive film, on a potentiometer, the electrically conductive component, for example carbon, causes a typical electrical microheterogeneity of the surface of the film, and thus causes increased contact resistivity at the film's wearing surface.

European patent document EP 0 399 295 A1 discloses a use of a vitreous carbon as an electrically conductive component in a resistive film. An electrical resistivity level is established by modifying a concentration or packing density of an electrically conductive component in the resistive film with respect to that of an electrically non-conductive component, such as a binding agent. In order to maintain desirable properties, such as mechanical and electrical stability, an optimum concentration or packing density of electrically conductive particles of the vitreous carbon, i.e. the mixture ratio of the two components, can vary only within a limited range.

It is an object of this invention to provide a method for producing powdery, vitreous carbon that saves money and time. A further object of this invention is to furnish a paste having predetermined electrical conductivity, and to disclose a resistive film having a high degree of abrasion resistance as well as mechanical and electrical stability.

SUMMARY OF THE INVENTION

This object is achieved through a method for producing powdered, vitreous carbon by pyrolysis of a resin in an inert atmosphere, wherein a polymer is cured to a three-dimensional, cross-linked resin and ground to a powder prior to the pyrolysis. This object is also achieved through a paste made of a mixture of electrically non-conductive and electrically conductive components. In the paste, different electrical conductivity is established, at a constant mixture ratio, by using a powdery, vitreous carbon produced by pyrolysis as an electrically conductive component. The electrical resistivity of the vitreous carbon is determined by the selective use of final pyrolysis temperature and pyrolysis duration. A resistive film may be prepared from such paste.

According to principles of the invention, a preferably aromatic polymer is cured to a three-dimensional, cross-linked resin, and is reduced to powder in this state prior to pyrolysis. Pyrolysis of the resulting powder is performed in an inert atmosphere, such as nitrogen, so that powdered, vitreous carbon (also called glass carbon powder) results. The powdery, vitreous carbon has various electrical resistivities that can be predetermined by using varying pyrolysis temperatures or pyrolysis times in each pyrolysis process. In so doing, the dependence of electrical resistivity on pyrolysis temperature and pyrolysis duration is utilized, as described in further detail in the periodical *Chemie-Ingenieur-Technik*, vol. 42, nos. 9–10, p. 663 (1970). By performing pyrolysis of the polymer in powder form, the duration of pyrolysis can be reduced significantly, introducing time savings into this method. The powdery, vitreous carbon resulting from pyrolysis, with its specified electrical resistivity, is then dispersed into a binding agent and ground in a mill along with the binding agent, to a grain size of <10 $\mu$m. Then the viscosity of the paste obtained in this manner with vitreous carbon is established by adding a quantity of solvent as a thinning agent, for producing a resistive film.

A resistive film having maximum mechanical and electrical stability, with a set but constant packing density of vitreous carbon, in which resistivity ranging from 0.2 KOhm to 1 MOhm per square unit of area can be predetermined, can be manufactured using the paste produced in this manner.

In the method of the present invention, the polymer is preferably an aromatic polymer. The polymer may be a natural or a synthetic polymer. Electrically conductive pigments, such as graphite, carbon black, and/or nickel, may be mixed into the polymer prior to curing. Preferably, curing of the polymer to the three-dimensional, cross-linked resin takes place at a temperature of 150° C. for a period of 30 minutes. Subsequently, the cured resin is ground to a particle size, preferably, of <145 $\mu$m. In accordance with the present invention, a final pyrolysis temperature and a duration of pyrolysis are set so that a predetermined electrical resistivity is established in the vitreous carbon.

The present invention also provides paste as described above. In the paste of the invention, the powdery, vitreous carbon may be dispersed with a binding agent as an electrically non-conductive component and milled to a powder, preferably having a particle size of <10 μm, at the same time. The paste is made ready for screen printing by addition of a solvent. In the resistive film of the invention, resistivity per square unit of surface area may be predetermined by selection of a vitreous carbon with a specific resistivity, or by selection of the paste produced using the vitreous carbon.

As indicated, the electrical conductivity of the vitreous carbon can be further influenced by mixing in additional electrically conductive pigments, such as graphite or carbon black.

The conductivity of the glass carbon powder can also be influenced by addition of a catalyst, such as an iodine compound, the catalyst being similarly mixed into the resin to be pyrolyzed prior to the three-dimensional cross-linking. Simultaneous dispersing and grinding of the vitreous carbon and the binding agent during paste production reduces the time required for this process, and, through further milling of the paste, makes it possible to use the paste for thin resistive films that are highly resistant with respect to the surrounding area.

DESCRIPTION OF THE PREFERRED EMBODIMENTS

The invention is described and explained in more detail below, using examples of preferred embodiments. The described features, in other embodiments of the invention, can be used individually or in preferred combinations. The foregoing and other objects, features, and advantages of the invention will be apparent from the following more particular description of preferred embodiments of the invention.

Example I

In an Example I of an embodiment, a polymer, such as a phenolnovolac-hexamethylenetetramine mixture, is placed in powder or granular form into a container, and is cured in a fresh-air furnace at a temperature of 150° C. for a duration of preferably 30 minutes. During the curing process, the phenolnovolac foams up and then is transformed into a hard, brittle state, now cross-linked in three dimensions.

The cured phenolnovolac resin is ground, that is, pulverized, in a high-speed centrifugal mill, for example, to a particle size of <145 μm. Portions of the phenolnovolac powder are fed into a reaction tube of a tube furnace, and the reaction tube is flushed with nitrogen for approximately 10 minutes at room temperature. Then the reaction furnace temperature is increased by preferably 10° C. per minute. During pyrolysis, the phenolnovolac powder remains in the inert nitrogen atmosphere. Once a final pyrolysis temperature is reached, such as 775° C., 850° C., 1000° C., or 2200° C., for example, the temperature is maintained for approximately 3 hours. After this holding time, the tube furnace heat is switched off, and the reaction tube is cooled to room temperature as it is flushed with nitrogen.

After cooling is completed, the flow of nitrogen is switched off, and the powdery carbon, now vitreous owing to the pyrolysis, is removed from the reaction tube. The electrical resistivity of the powdery, vitreous carbon differs depending on the final pyrolysis temperature given the same duration of pyrolysis. Preferably 21 parts by weight of the vitreous carbon produced at temperatures of 775° C., 850° C., 1000° C., or 2200° C. are added to a hardenable polymer binding agent mixture, for producing a paste having predetermined electrical conductivity. Preferably, the binding agent mixture to be thoroughly mixed in consists of:

20 parts by weight fully etherified melamine resin, 9 parts by weight dissolved, saturated polyester resin, 10 parts by weight dissolved, modified esterimide resin, 3 parts by weight acid catalyst, 3 parts by weight dispersing agent (Efka P 401), 1 part by weight flow control agent (Byk U), 21 parts by weight butyl carbitol acetate.

The roughly mixed components of the binding agent are dispersed with the powdery, vitreous carbon in a planetary high-speed mill, whereby the vitreous carbon is ground to a grain or particle size of <8 μm at the same time. That is, it is dispersed and ground in a single pass.

After the dispersion and milling process is completed, the paste obtained in this manner is used for producing a resistive film at screen printing viscosity, for example 8500 cP. To that end, a quantity of solvent necessary for producing a resistive film is added to the paste to thin it. The added quantity of solvent is taken into consideration in the composition of the binding agent. The quantity of solvent is determined from adaptation of the paste to a conventional screen printing device. The quantity of solvent necessary for determining the viscosity, depending on the device and the film thickness to be produced, is subtracted during composition of the binding agent, thus preventing any adverse influence on the resistivity of the paste during production of the resistive film.

The paste that is now ready for screen printing is printed onto an electrically non-conductive substrate as a resistive film, by means of a screen printing device. The film is then cured for a curing time of approximately 1 hour at a temperature of 230° C.

Given identical film thickness, such as for example 15 μm, various cured resistive films exhibit varying resistivities per square unit of surface area in the film, using the same quantity of vitreous carbon produced at the various temperatures, at a particle size of <8 μm.

A resistive film using vitreous carbon produced at 775° C. exhibits resistivity of 32 KOhm per square unit of surface area, at a film thickness of 15 μm, whereas, at the same film thickness and with the vitreous carbon produced at 2200° C., resistivity is 0.235 KOhm per square unit of surface area. For other required film thicknesses, the quantity of the respective vitreous carbon needed is calculated in advance, in each case. Resistivities already established for other film thicknesses can be taken into consideration in this process.

Example II

An Example II of an embodiment indicates a further variant for influencing the electrical conductivity or electrical resistivity of the powdery, vitreous carbon.

To that end, 75 parts by weight of phenolnovolac-hexamethylenetetramine as a powdery mixture is dissolved in a glass flask with 800 ml acetone. Five parts by weight of powdered graphite having a grain size of <35 μm is stirred into this solution. Then the 800 parts by weight of acetone are distilled off from the dispersion, under constant stirring.

The mixture of phenolnovolac and powdered graphite dispersion is decanted into a container and cured as in Example I, in a fresh-air furnace at a temperature of 150° C. for approximately 30 minutes.

The remaining processing steps proceed as in Example I.

Through this variant, the mixture is given a different electrical resistivity from the very beginning. The powdered graphite causes the vitreous carbon produced during pyrolysis to have a modified crystalline structure in comparison to that produced in Example I. This different crystalline structure is more similar to the crystalline structure of graphite. In this manner, the vitreous carbon is more electrically conductive, so that, given the same polymer film thickness, the same packing density, and the same final pyrolysis temperature/pyrolysis time, different resistivities per square unit of surface area can be obtained. Thus, the resistive film of Example I, at a final pyrolysis temperature of 1000° C., has resistivity per square unit of surface area of 0.46 KOhm per square unit of surface area, whereas the resistivity per square unit of surface area in Example II, at the same final pyrolysis temperature, is only 0.185 KOhm per square unit of surface area, and thus the resistive film produced is itself of lower impedance.

It is clear that modifications are possible within the framework of the inventive concept.

For example, in addition to aromatic polymers, a series of natural and synthetic polymers may be utilized as initial material for producing the vitreous, powdery carbon.

Advantageously, for example, polyphenylenes, polyimides, aromatic epoxy resins, polyphenols, and furan resins may be used as highly cross-linked, aromatic polymers.

In addition to powdered graphite and/or carbon black, nickel may also be used, alone or in combination, as an electrically conductive pigment. These pigments may also be dispersed into the binding agent in a known manner.

Essentially all members of the family of hardenable resins can be used in modified form or in combination as binding agents for the paste pursuant to the invention for producing the resistive film. Example of such resins include alkyds, epoxides, melamines, polyacryls, polyesters, polyimides, polyphenols, polyurethanes, and so on.

Iodobenzene, boric acid, iron oxide, and/or bromostyrene can be mixed into the resin to be pyrolyzed prior to three-dimensional cross-linking, as additives for crystal formation of the carbon.

Vitreous carbons with varying electrical resistivities can be mixed into a paste together.

Instead of or in addition to selecting various final pyrolysis temperatures, duration of pyrolysis may be selected variably in order to produce a vitreous carbon having different electrical resistivities.

The invention claimed is:

1. A paste made of a mixture of electrically non-conductive and electrically conductive components, wherein, at a constant mixture ratio of said electrically conductive and electrically non-conductive components, different electrical conductivity is established by using a powdery, vitreous carbon produced by pyrolysis as an electrically conductive component, the electrical resistivity of which vitreous carbon is predetermined by the selection of a predetermined, single pyrolysis temperature and duration to provide a predetermined electrical resistivity.

2. The paste of claim 1, wherein the powdery, vitreous carbon is dispersed with a binder as an electrically non-conductive component and is milled to a powder at the same time.

3. The paste of claim 2, wherein the vitreous carbon and the binder are milled to a particle size of <10 $\mu$m.

4. The paste of claim 1, wherein the paste is made ready for screen printing by addition of a solvent.

5. A resistive film prepared from a paste as in claim 4.

6. The resistive film of claim 5, wherein its resistivity per square unit of surface area is predetermined by selection of a vitreous carbon with a specific resistivity, or by selection of a paste produced using said carbon.

7. The resistive film of claim 6, wherein resistance values are predeterminable in the range of about 0.2 KOhm to 1 KOhm per square unit of area at a uniform packing density of the vitreous carbon in the resistance paste.

* * * * *